Figure 1:
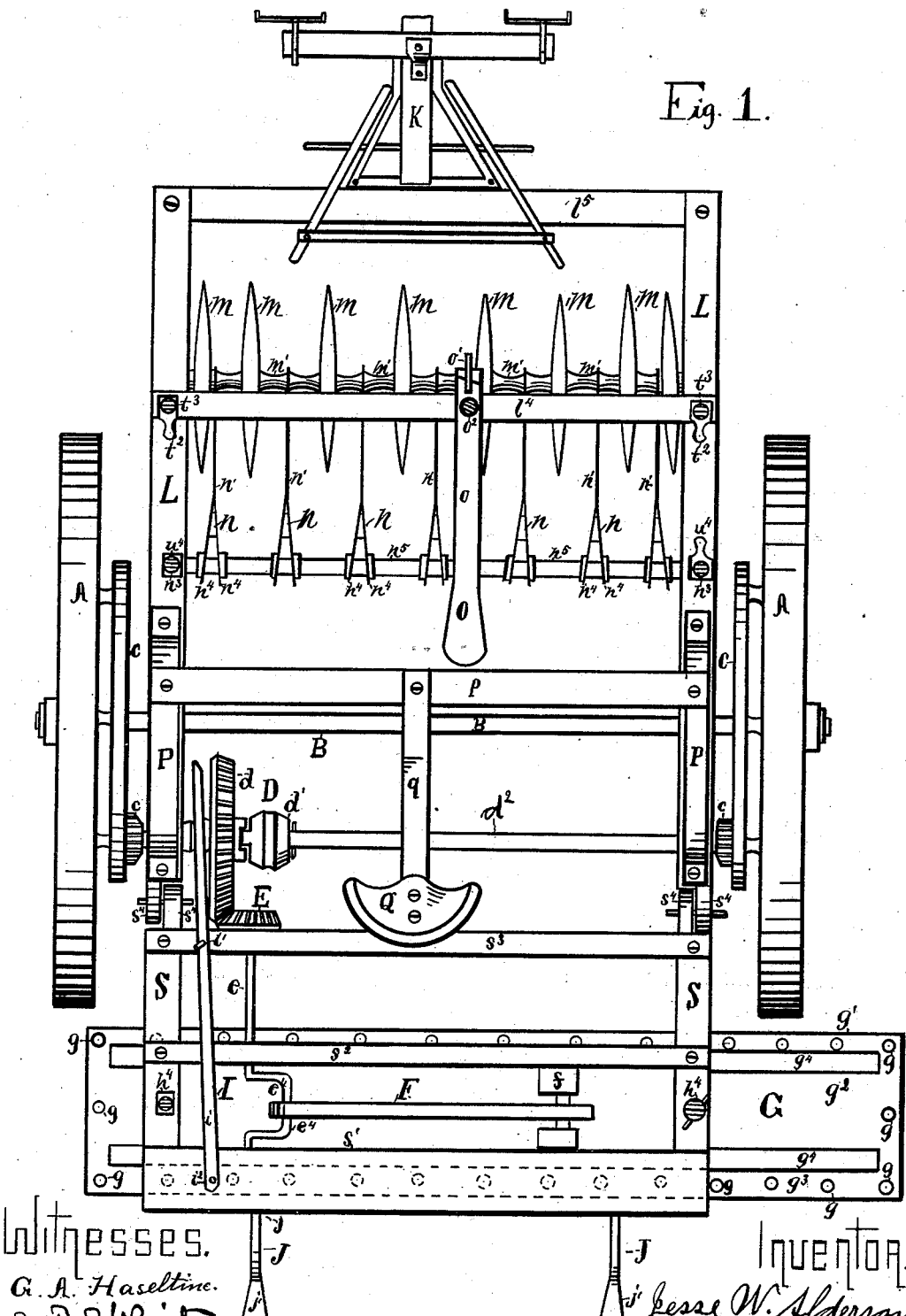

(No Model.)  2 Sheets—Sheet 1.

J. W. ALDERSON.
MACHINE FOR CUTTING, PLOWING, HARROWING, &c.

No. 308,865.  Patented Dec. 9, 1884.

Witnesses.
G. A. Haseltine.
J. T. White.

Inventor.
Jesse W. Alderson
By Seward A. Haseltine
Atty.

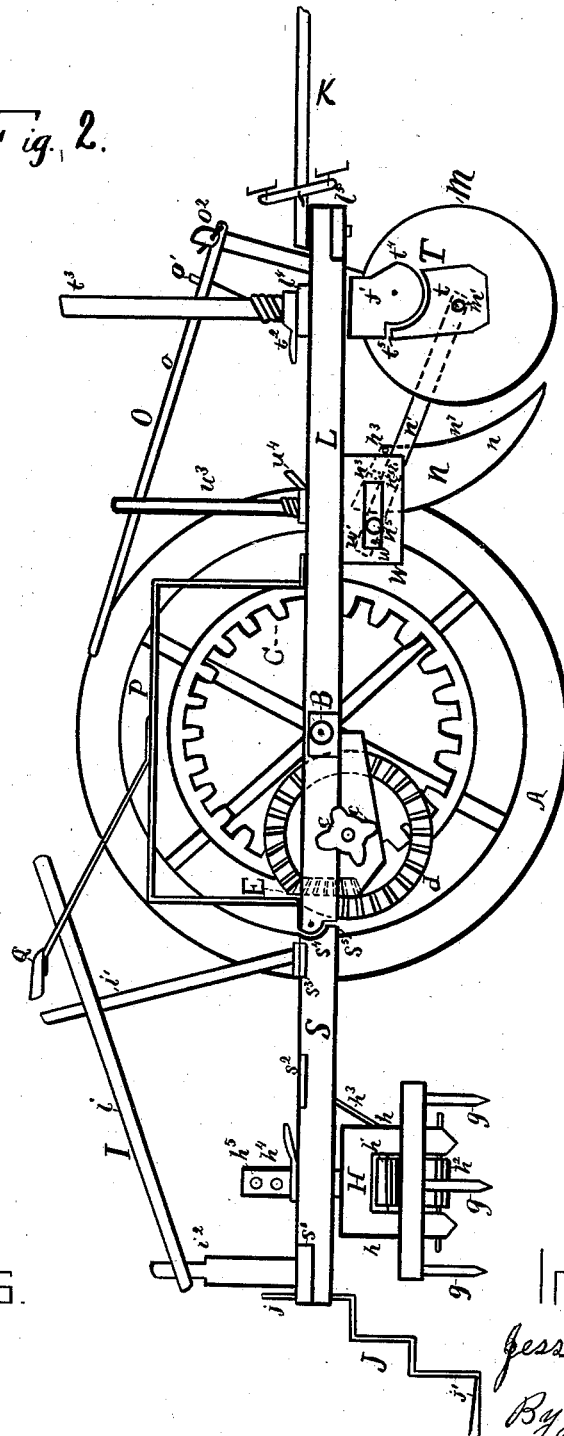

UNITED STATES PATENT OFFICE.

JESSE W. ALDERSON, OF WASHBURN, MISSOURI.

MACHINE FOR CUTTING, PLOWING, HARROWING, &c.

SPECIFICATION forming part of Letters Patent No. 308,865, dated December 9, 1884.

Application filed February 19, 1884. (No model.)

*To all whom it may concern:*

Be it known that I, JESSE W. ALDERSON, a citizen of the United States, residing at Washburn, in the county of Barry and State of Missouri, have invented certain new and useful Improvements in Devices for Cutting, Plowing, Harrowing, and Marking Ground, of which the following is a specification, reference being had therein to the accompanying drawings.

My invention relates to improvements in devices for cutting, plowing, harrowing, and marking ground, and in the construction and arrangement of its several parts; and also in the combination of wheel or disk shares, followed by long sharp plows, and behind said plows a side moving or sifting harrow followed by a marker, the object of which is to provide a machine that will conveniently, rapidly, and thoroughly prepare ground for planting and sowing. These objects I attain by means of the device illustrated in the accompanying drawings, forming a part of this specification, in which—

Figure 1 is a plan or top view showing the entire device. Fig. 2 is a side view with one of the wheels removed to show the construction.

A represents wheels having bearings upon an axle, B, which supports the entire framework of the device. C are cog-wheels firmly attached on the inside of the wheels A. The pinions $c$ are driven by the said cog-wheels, and by means of the shaft $d^2$, which has suitable bearings in the frame L, are geared and ungeared on one but preferably on both sides of and to the cog-wheel $d$. A pinion, E, is operated by the cog-wheel $d$, and thus, by means of a shaft, $e$, having suitable bearings and an eccentric or crank, $e^4$, drives a pitman, F, which has suitable attachments, $f$, to a harrow, G. The said harrow is preferably made having three parts, $g'$ $g^2$ $g^3$, firmly held together, leaving slots $g^4$, and having two or more rows of teeth, $g$. The middle part, $g^2$, is placed between two rollers, $h'$ $h^2$, of adjustable supports, H, said supports being raised or lowered by means of a screw-nut having a handle, $h^4$, or by a pin placed through the part $h^5$, or other suitable device to hold the same to the frame S. By these means the harrow G is rapidly moved back and forth sidewise, or from left to right, as the machine moves forward. J are markers, made of rods bent in any desired shape, preferably flattened, at $j'$, at the back or bottom end, and attached at the other end by any suitable means to the cross-piece $s'$ of the frame S. The frame S is hinged to the frame L by hinges $s^4$, having suitable shoulders, $s^5$, to prevent letting the back end drop or fall below the horizontal. These hinges also permit the back part of the frame S to be lifted by a lever, I, having attachments $i'$ $i^2$, and thereby lifting the harrow and marker from the ground. Supports T and U are raised and lowered similar to the supports H. The front supports, T, are hinged at $t^4$, having shoulders $t^5$ to prevent the lower part, $t$, from going back of the perpendicular, but permits it to move forward and upward. To this lower part, $t$, are attached suitable bearings for the revolving shaft $m'$. Upon the said revolving shaft are firmly attached disks or cutters M, and alternating with and between the said disks are arms $n'$. These arms extend backward, forming a fork, $n^4$ $n^4$, and are attached to a movable rod, $n^5$, the ends of said rod resting in a horizontal slot, $u^2$, which is cut in the head of the support U, which is adjustable in height by any suitable means—as a pin or screw on the upper end extending through the frame S.

In the fork $n^4$ $n^4$ are attached plows N. Said plows are made long, narrow, pointed, and with a sharp front edge, $n^7$, and preferably secured by means of a bolt, $n^6$, through the fork of the said arm, and it is provided with holes $n^3$ $n^3$, in which may be placed wooden pins that will rest against the top of the arm, to hold the plows in the desired position, and serve as safety-pins, to break and save the other machinery in case a plow gets caught. The plows are also regulated in depth by the support U, and the disks by the support T. By means of a lever, O, and suitable attachments, $o'$ $o^2$, the disks and plows are lifted forward and upward out of the ground.

Q is a spring-seat upon an elevated frame, P.

The device is operated thus: By means of the adjustable supports T U the depth of the shares and the plows is regulated. Thus the ground may be cut and stirred to any desired depth. When the ground is soft, the shares or disks will cut the ground sufficiently, and the plows may be dispensed with. The clods and ground being cut and loosened while fresh, are easily smoothed and sifted. This I accomplish by attaching to the back part of the frame, as above described, a harrow, the teeth of which are made to cut back and forth crosswise of the furrows made by the disks or shares and plows. By this means the ground is made soft, smooth, and thoroughly pulverized, and is therefore ready for a marker. I place the marker, as above explained, behind the harrow, and thus prepare the field for planting by passing over it once. When small grain is to be sown, the marker need not be used. This machine performs the work by once going over a field that usually requires several machines and several times passing over the same ground.

When the ground is level and smooth, the harrow may be raised; but ordinarily all parts are used and needed to properly prepare the ground.

Having thus described the construction, use, and operation of my invention, what I claim as new, and desire to secure by Letters Patent, is—

1. In an improved machine for cutting, plowing, harrowing, and marking ground, a harrow, G, having the parts $g'$ $g^2$ $g^3$, slots $g^4$, and two or more rows of teeth $g$, said harrow having adjustable supports H, connecting it with a frame, S, hinges $s^4$, having shoulders $s^5$ to connect the frames L S upon the axle and wheels B A, a lever, I, having attachments $i'$ $i^2$, supports H, having rollers $h'$ $h^2$, and attachments for moving the said harrow back and forth, all substantially as shown and described.

2. In an improved cutting, plowing, harrowing, and marking machine, a device for cutting and plowing, composed of disks M, attached to a revolving shaft, $m'$, having bearings in an adjustable support, T, said support having a hinge, $t^4$, with shoulders $t^5$, arms $n'$, having bearings between the disks and attached to a movable rod, $n^5$, narrow plows N, having a sharp edge, $n^7$, and a supporting-bolt, $n^6$, and holes $n^3$ for safety-pins, an adjustable support, U, having a horizontal slot, $u^2$, a frame, L, resting upon an axle and wheels B A, all substantially as and for the purpose set forth.

In testimony whereof I affix my signature in presence of two witnesses.

JESSE W. ALDERSON.

Witnesses:
L. B. McNATT,
WILLIAM FERGUSON.